MICROWAVE ACOUSTIC DELAY LINE

Filed Oct. 31, 1960

INVENTOR.
JOSEPH B. BRAUER
BY Wade Koontz
and George Fine
ATTORNEYS 3,071,741

MICROWAVE ACOUSTIC DELAY LINE

Joseph B. Brauer, Rome, N.Y., assignor to the United States of America as represented by the Secretary of the Air Force Filed Oct. 31, 1960, Ser. No. 66,361
6 Claims. (Cl. 333—30)
(Granted under Title 35, U.S. Code (1952), sec. 266)

The invention described herein may be manufactured and used by or for the United States Government for governmental purposes without payment to me of any royalty thereon.

This invention relates to delay means and particularly to microwave acoustic delay means.

In the prior art, the separation between successive signal pulses in a supersonic delay device is on the order of microseconds, some means must be provided for either identifying each pulse in a chain of pulses equal to the delay time of a rebound device or a separate path must be provided between input and output so that there is no interference between or overlapping of successive rebounds. The former technique introduces great complexity into any delay structure and is not feasible for practical devices except those of very short delay time.

The latter technique is most useful in delay devices having a long time delay, and in accordance with the present invention there is provided a flat plate of crystalline or fused quartz. The plate is shaped from a square or rectangular plate into the form of a parallelogram. In so shaping the plate, two opposite ends thereof are cut or shaved off at an angle. In making the angular cut, square appendages are left at opposite corners of the parallelogram. Input and output transducers, oriented at right angles to the plane of the faces of the plate, are attached to these appendages. The physical dimensions of the plate control the number of reflections the delayed signal will undergo between the input and the output transducers and thus control the delay time. The shape of the transducer of the present invention and the relation of the input and the output transducers to the aforementioned shape permits a relatively long delay time with complete isolation of the path of the signal from input to output. In the prior art delay devices, there are cross-over points of the reflected signal thus introducing the possibility of interference.

An object of the present invention is to provide a microwave acoustic delay line having a maximum delay time in a small volume.

Another object of the present invention is to provide a microwave acoustic delay line having a complete isolation of all signal paths with no cross-over at any point therein.

Still another object of the present invention is to provide a microwave acoustic delay line wherein the inherent compact form factor allows cooling of the delay media to very low temperatures where the attenuation is minimized.

Still another object of the present invention is to provide a microwave acoustic delay line providing the maximum use of the available sizes and orientations of piezoelectric crystals.

A still further object of the present invention is to provide a microwave acoustic delay line operative over a broad range of frequencies and also providing a wide range of delay times.

These and other objects and advantages of this invention, which will be in part obvious and in part pointed out hereinafter, are obtained by the means described in the following specifications, and may be more readily understood by reference to the accompanying drawings, showing one of the various possible embodiments of this invention, in which.

Figure 1:
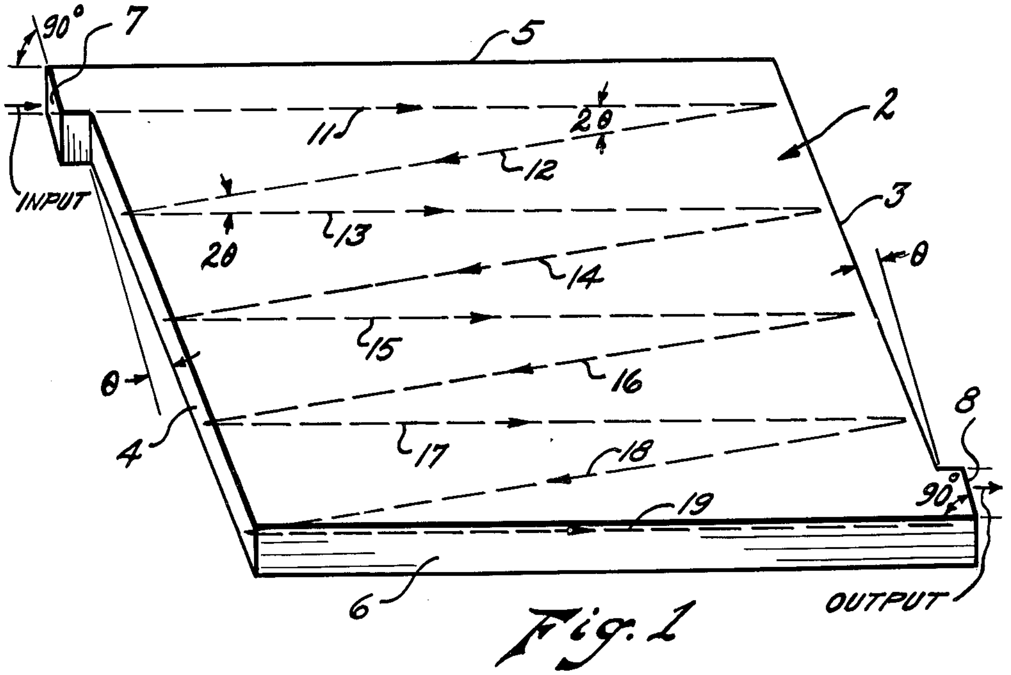
FIGURE 1 is an isometric view of the crystalline delay media utilized in the preferred embodiment of the present invention.

Now referring in detail to FIGURE 1, there is shown an isometric view of crystalline quartz flat plate 2. It is to be noted that fused quartz may also be utilized. Faces 3 and 4 are parallel to each other, as are faces 5 and 6 and faces 7 and 8. Any variation of face orientation is possible so long as the signal enters and leaves properly at faces 7 and 8, respectively, and achieves the proper number of reflections within the delay media for the desired total length path.

Input and output transducer faces 7 and 8, respectively, are oriented at right angles to the plane of the large face of the crystalline quartz plate. The signal path emanates normal to the transducer faces and is reflected, for the desired path length, successively between two opposite edges of the flat plate which are facing each other in slightly angled position.

The angle is determined only by the minimum separation of adjacent paths which will avoid interference between signals occurring simultaneously in the adjacent paths and the accuracy to which the faces 3 and 4 can be finished and oriented.

Faces 7 and 8 are transducer faces. No separate transducer is required if crystalline quartz or any other suitable piezoelectric material (properly oriented) is used for the delay media. It is to be noted that the plate of FIGURE 1 is shaped from a flat square plate of crystalline quartz into the form of a parallelogram. In so shaping the plate, two opposite ends thereof are cut or shaved off at an angle. In making the angular cut, square appendages are left at opposite corners of the parallelogram.

For crystalline quartz the orientation is with the X-axis parallel to faces 5 and 6. For non-piezoelectric materials, transducers would have to be attached to faces 7 and 8.

Figure 2:
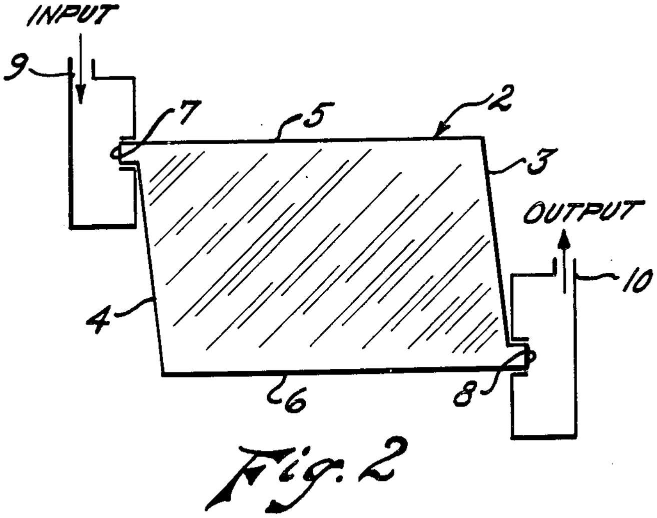
FIGURE 2 is the plan view of the preferred embodiment of the present invention.

Now referring to FIGURE 2, there is shown the delay media as illustrated in FIGURE 1 which also includes tuned cavities 9 and 10. Tuned cavity 9 may be any conventional resonant microwave cavity. Tuned cavity 9 receives a microwave signal from any compatible wave guide. The received microwave signal resonates in tuned cavity 9.

Input 7 of delay media 2 is coupled into tuned cavity 9 by way of rectangular opening 20 and is energized thereby. Thus the microwave signal energizes the crystalline delay media in the acoustic mode.

The sonic impulses created at input 7 of delay media 2 are transmitted along signal path 11 to face 3 which in this embodiment reflects the sonic signal at a $2\theta$ angle which is then transmitted along path 12 to face 4. The sonic signal is then reflected back and forth from faces 3 to 4 along paths 13–19 respectively, the angle of reflection from each face being $2\theta$. The sonic signal finally is available at output 8. Output 8 is coupled into tuned cavity 10 by way of rectangular opening 21. The sonic signal is then converted back into a microwave signal in tuned cavity 10 and is available as a microwave signal at the output thereof. Thus it is seen that a microwave signal has been delayed in time with the complete isolation of all signal paths in the delay media with no cross-overs at any point. It is to be noted the device of the present invention provides maximum delay in a small volume and the compact form factor allows efficient cooling of the delay media to very low temperatures where the attenuation is minimal.

For example, the delay that is available in the utilization of the present invention may be as follows:

where $L$=perpendicular distance between faces 3 and 4
$l$=length of path in each pass between faces 3 and 4 then $$l=\frac{L}{\cos\theta}$$

$LC$=length of face 3 between first rebound point and output 8
$n$=total number of passes along length $l$ then $$n=\frac{LC}{d}+l$$

$d=l\times\sin\theta$
$T$=total delay time
$T=n\times l\times$propagation constant using crystalline quartz with a propagation velocity=.6 cm. microsecond
Propagation constant=1.75 microseconds per cm. of path length If $L$=5 cm. and $LC$=5.15 cm. and $\theta=1°$ then $$l=\frac{L}{\cos\theta}=\frac{5\text{ cm.}}{0.99985}=5.00075\text{ cm.}$$

$$d=l\sin\theta=0.08726\text{ cm.}$$

$$\frac{LC}{d}=\frac{5.15\text{ cm.}}{.08}\text{26 cm.}=59\text{ passes}$$

$$n=\frac{LC}{d}+1=60\text{ passes}$$

$$T=n\times l\times 1.75\text{ microseconds/cm.}$$
$$=60\times5\times1.75=525\text{ microseconds}$$

Thus, for example, a microwave signal may be delayed in time 525 microseconds, wherein the delayed signal is provided with a separate path from input to output of the delay media wherein there is no interference between or overlapping of successive rebounds.

What is claimed is:

1. A microwave acoustic delay line comprising a crystalline quartz flat plate in the form of a parallelogram, said plate having square appendages extending from opposite corners thereof, means to impress one of said square appendages with a microwave signal to energize said plate in the acoustic mode, and means to reconvert the acoustic mode energization of said plate to a microwave signal, said reconverting means including the other of said square appendages.

2. A microwave acoustic delay line comprising a crystalline quartz flat plate in the form of a parallelogram, said parallelogram having square appendages extending from opposite corners thereof, a pair of resonant microwave cavities, the first of said pair of cavities receiving a microwave signal, first means to couple the first of said square appendages to said first cavity, said first means consisting of a first rectangular opening in said first cavity receiving said first square appendage, and second means to couple the second of said pair of appendages into said second of said pair of cavities, said second means consisting of a second rectangular opening in said second cavity receiving said second appendage.

3. A microwave acoustic delay line comprising a solid microwave acoustic delay media in the form of a parallelogram, said parallelogram having square appendages extending from opposite corners thereof, means to energize said delay media in the acoustic mode, said energizing means receiving a microwave signal to be impressed upon one of said square appendages, and means to reconvert the acoustic mode to said microwave signal, said reconverting means including the other of said square appendages.

4. A microwave acoustic delay line comprising a solid microwave delay media in the form of a parallelogram, said parallelogram having square appendages extending from opposite corners thereof, means to energize said delay media in the acoustic mode, said energizing means receiving a microwave signal and also having one of said square appendages coupled thereto, and means to reconvert said acoustic mode to a microwave signal, said reconverting means having the other of said square appendages coupled thereto.

5. A microwave acoustic delay line comprising a flat plate of crystalline quartz in the form of a parallelogram, said parallelogram having square appendages extending from opposite corners thereof, a pair of tuned resonant microwave cavities, the first of said cavities receiving a microwave signal to be delayed, first means to couple said plate to said first of said cavities, said first coupling means consisting of a rectangular opening in said first cavity receiving one of said square appendages, and second means to couple out said delayed signal, said second coupling means consisting of a rectangular opening in said second cavity receiving said other square appendage.

6. A microwave acoustic delay apparatus comprising a pair of resonant microwave cavities, each of said cavities having a rectangular opening therein; said first cavity receiving a microwave input signal and said second cavity providing a microwave signal output, a flat plate of crystalline quartz in the form of a parallelogram, said parallelogram having square appendages extending from opposite corners thereof, first means to energize said flat plate of crystalline quartz in the acoustic mode, said first means consisting of said rectangular opening in said first cavity receiving one of said square appendages, and second means to reconvert said acoustic mode into said microwave signal, said second means consisting of said rectangular opening receiving the other of said square appendages.

References Cited in the file of this patent

UNITED STATES PATENTS

| | | |
|---|---|---|
| 2,540,720 | Forbes et al. | Feb. 6, 1951 |
| 2,773,996 | Slater | Dec. 11, 1956 |
| 2,883,660 | Arenberg | Apr. 21, 1959 |
| 2,920,294 | Keith | Jan. 5, 1960 |